United States Patent
Liao et al.

(10) Patent No.: US 7,242,949 B2
(45) Date of Patent: *Jul. 10, 2007

(54) MULTIMEDIA INFORMATION AND INFORMATION INQUIRY DOWNLOAD SERVICE

(75) Inventors: Sheng-Hsuan Liao, Taipei (TW); Ting-Hsun Kao, Taipei (TW); Meng-Ying Tsai, Taipei (TW)

(73) Assignee: FarEasTone Telecommunications Co., Ltd., Taipei (TW)

( * ) Notice: Subject to any disclaimer, the term of this patent is extended or adjusted under 35 U.S.C. 154(b) by 480 days.

This patent is subject to a terminal disclaimer.

(21) Appl. No.: 10/820,722

(22) Filed: Apr. 9, 2004

(65) Prior Publication Data

US 2004/0237121 A1   Nov. 25, 2004

(30) Foreign Application Priority Data

Apr. 11, 2003   (TW) ............................... 92108438 A

(51) Int. Cl.
*H04Q 7/20* (2006.01)
*H04M 11/00* (2006.01)

(52) U.S. Cl. ............................... 455/456.3; 455/414.1; 455/414.2; 455/414.3; 455/406; 701/207; 701/208; 707/10; 707/104.1; 709/218; 709/219

(58) Field of Classification Search ............... 455/405, 455/406, 414.1, 414.2, 414.3, 426.1, 466, 455/408, 456.3; 701/200, 201, 207–211; 370/395.5; 707/104.1, 1, 3, 10; 709/217–219, 709/230
See application file for complete search history.

(56) References Cited

U.S. PATENT DOCUMENTS

| | | | | |
|---|---|---|---|---|
| 6,556,217 | B1* | 4/2003 | Makipaa et al. | 345/667 |
| 6,640,097 | B2* | 10/2003 | Corrigan et al. | 455/414.1 |
| 6,944,447 | B2* | 9/2005 | Portman et al. | 455/422.1 |
| 6,968,175 | B2* | 11/2005 | Raivisto et al. | 455/406 |
| 2001/0041566 | A1* | 11/2001 | Xanthos et al. | 455/423 |
| 2002/0019812 | A1* | 2/2002 | Board et al. | 705/51 |
| 2002/0035617 | A1* | 3/2002 | Lynch et al. | 709/219 |
| 2002/0077084 | A1* | 6/2002 | Zellner et al. | 455/414 |
| 2002/0155848 | A1* | 10/2002 | Suryanarayana | 455/466 |
| 2002/0161587 | A1* | 10/2002 | Pitts et al. | 704/276 |
| 2002/0193094 | A1* | 12/2002 | Lawless et al. | 455/407 |
| 2003/0060188 | A1* | 3/2003 | Gidron et al. | 455/408 |
| 2003/0065802 | A1* | 4/2003 | Vitikainen et al. | 709/231 |
| 2003/0125023 | A1* | 7/2003 | Fishler | 455/426 |
| 2003/0211845 | A1* | 11/2003 | Lohtia et al. | 455/414.3 |
| 2004/0002324 | A1* | 1/2004 | Juntunen et al. | 455/406 |
| 2004/0075675 | A1* | 4/2004 | Raivisto et al. | 345/700 |

(Continued)

*Primary Examiner*—William Trost
*Assistant Examiner*—James D Ewart
(74) *Attorney, Agent, or Firm*—Rosenberg, Klein & Lee

(57) ABSTRACT

A structure of a multimedia information service and an information inquiry download service. Users access an information inquiry platform with mobile phones, in order to search for and download information. Depending on the type of requested information a content provider obtains or supplies the user's desired information. The information is then transmitted to a common service platform. The common service platform transmits the information to the user's mobile phone via a multimedia service center. If necessary, the user's location can be automatically obtained in order to provide location specific information such as maps, directions, or addresses.

6 Claims, 2 Drawing Sheets

U.S. PATENT DOCUMENTS

2004/0098625 A1* 5/2004 Lagadec et al. ............ 713/201
2004/0120323 A1* 6/2004 Viikari et al. ............ 370/395.5
2004/0181550 A1* 9/2004 Warsta et al. ............ 707/104.1
2004/0209602 A1* 10/2004 Joyce et al. ............. 455/414.1
2005/0027591 A9* 2/2005 Gailey et al. ................ 705/14
2006/0195570 A1* 8/2006 Zellner et al. ............. 709/224

* cited by examiner

MULTIMEDIA INFORMATION AND INFORMATION INQUIRY DOWNLOAD SERVICE

BACKGROUND OF THE INVENTION

1. Field of the Invention

The present invention relates to multimedia information services. More specifically, the present invention discloses a multimedia information and information inquiry download service allowing users to download information via mobile communication equipment utilizing unstructured supplementary service data (USSD) or wireless application protocol (WAP).

2. Description of the Prior Art

Due to advancements in telecommunication technology, bandwidth has increased, and the convenience of mobile communications has greatly improved. Therefore, the distance between people has shortened. Presently, $3^{rd}$ generation mobile phones have been developed, which provides Internet access and multimedia information services. As mobile phone functions get stronger, the added value of the phone increases. Therefore, people's lives have become more convenient and the quality of their lives has been enriched. Mobile phones have now become an essential tool in our daily life.

In an advanced information society, people inquire about many different types of information. For example, travellers can find maps, weather reports and near-by highways or streets on the Internet before leaving for their destinations. However, it typically takes time to search and download the information, which is not convenient.

Additionally, if someone wants to change their route, they need to use their computer to search and download the new information from the Internet. This cannot achieve the purpose of immediacy that is useful and convenient. For example, it cannot satisfy the need to provide directions to near-by gas stations or restaurants according to the user's current location. Although $3^{rd}$ generation mobile phones already have powerful functions, the additional service provided to users still cannot satisfy their needs. Therefore, a current dilemma today, is how to improve additional services in order to provide greater and more useful services to users.

Therefore, there is a need for a multimedia information and information inquiry download service allowing users to use mobile phones to search and download desired information instantly and conveniently.

SUMMARY OF THE INVENTION

To achieve these and other advantages and in order to overcome the disadvantages of the conventional method in accordance with the purpose of the invention as embodied and broadly described herein, the present invention provides a multimedia information and information inquiry download service allowing users to download information via mobile communication equipment such as mobile phones utilizing unstructured supplementary service data (USSD) or wireless application protocol (WAP).

An object of the present invention is to provide a structure of a multimedia information and information inquiry download service. It allows users to instantly download desired information through multimedia information services, using USSD or WAP, in order to improve the mobile phone's added value and satisfy users' needs.

Another object of the present invention is to provide a structure of a multimedia information and information inquiry download service which can automatically obtain the location of the mobile phone user, and then provide appropriate desired information according to the user's location.

The structure of the multimedia information and information inquiry download service of the present invention comprises using a mobile phone to enter an information service platform in order to proceed with searching and downloading information. An information content provider server stores the information that can be searched for or downloaded by users. The information content provider can be installed internally as an internal information content provider server or installed externally as an external information content provider server, in order to increase the flexibility of information storage. In this way, independent content service providers can maintain their own content servers at their own location or multimedia service providers can contain the available content on-site on their own content servers. Furthermore, a combination of internal and external content servers is provided by the present invention.

When the information content provider is located internally, the information inquiry service platform enters the internal information provider directly to obtain the desired information and then sends the obtained information to a common service platform. The common service platform sends the information to a multimedia messaging service center. Finally, the multimedia messaging service center transmits the information to the user's mobile phone.

When the information content provider is located externally, the information inquiry service platform sends a request for the desired information to the external information provider. The external information provider then obtains the desired information from the external information provider server, and sends the appropriate information to the user via the common service platform and multimedia messaging service center.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
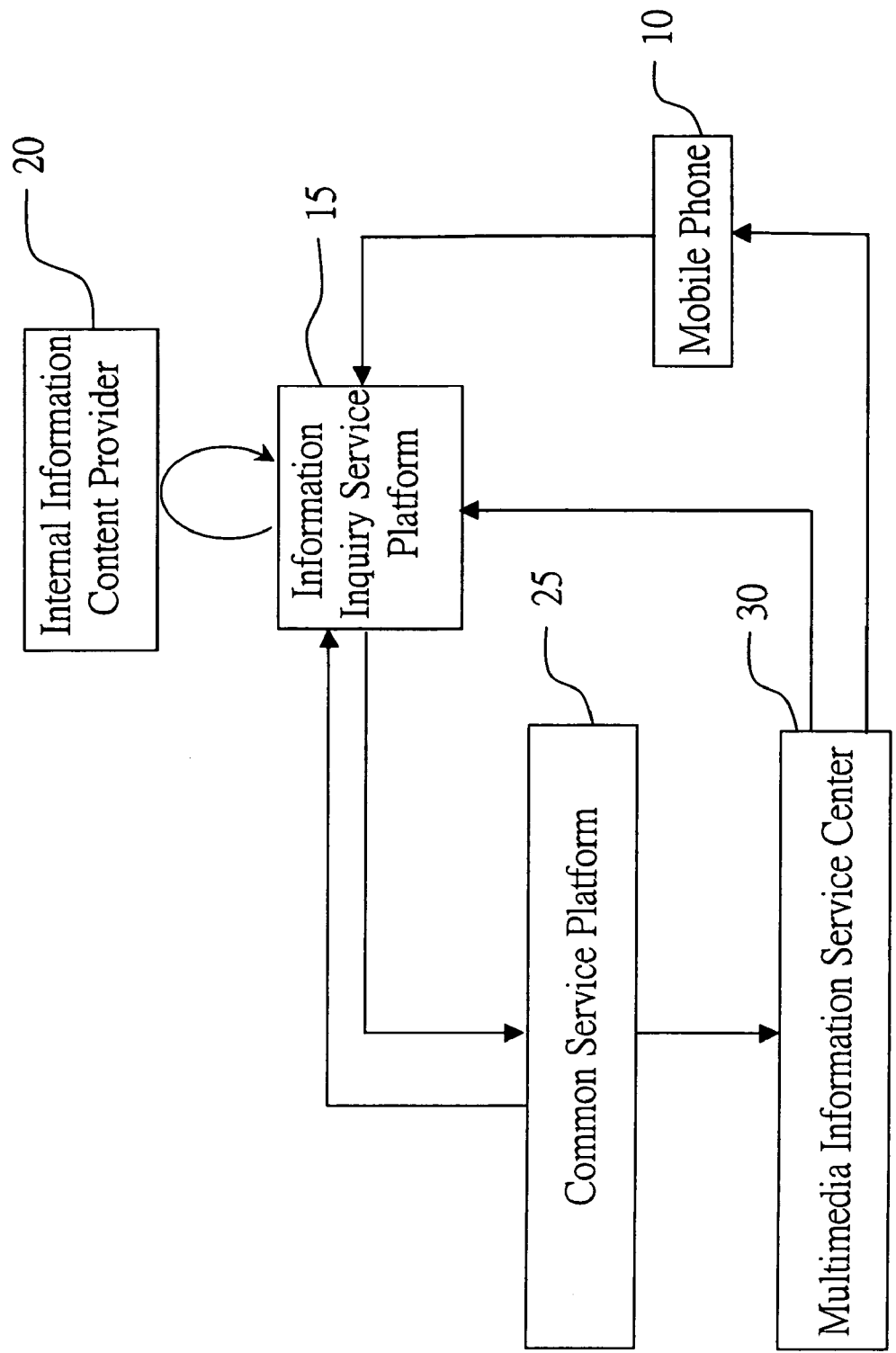
FIG. 1 is a block diagram illustrating a multimedia information and information inquiry download service according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

The present invention utilizes USSD or WAP through a mobile phone to provide mobile phone users with a means check and download information directly to the mobile phone, conveniently and instantly. Furthermore, the present invention automatically obtains the exact location of the user and provides the user with more detailed and accurate information according to their needs. In doing so, the multimedia information value of the mobile phone is increased.

Refer to FIG. 1, which is a block diagram illustrating a multimedia information and information inquiry download service according to an embodiment of the present invention.

As shown in FIG. 1, the mobile phone user can use USSD or WAP to enter the information inquiry service platform 15 using a mobile phone 10 in order to proceed with information inquiry and download. According to items selected by the user, the information inquiry service platform 15 accesses an internal information content provider or server 20 to obtain the required information requested by the user. The requested information can be, for example, a weather report or a list of restaurants in a city. The internal information content provider 20 has stored information that can be inquired about or requested by users.

The information inquiry service platform 15 then transmits the obtained information to a common service platform 25. The common service platform 25 transmits the obtained information to a multimedia messaging service center or multimedia information service center 30. Finally, the multimedia information service center 30 sends the information to the user's mobile phone 10. Once the multimedia information service center 30 has finished transmitting the information, it sends another message to the information inquiry service platform 15. When the information inquiry service platform receives the message, it sends a message to the common service platform 25 providing information used regarding payment.

If the information inquired about by the user requires the knowledge of the exact location of the user, then the information inquiry service platform 15 automatically obtains the exact location of the user from the common service platform 25. This type of information requiring location information is for example, if the user requests information regarding the location of near-by restaurants or addresses of businesses.

The common service platform 25 utilizes a base positioning system or a global positioning system, such as GPS, to obtain the location of the mobile phone user. Then according to the location, the information inquiry service platform 15 goes to the content server or internal information provider 20 to gather the information. Finally, the message containing the information is sent to the mobile phone 10 via the common service platform 25 and the multimedia messaging service center 30. The information sent to the mobile phone comprises maps to facilitate the user in locating the desired restaurant, business, or address. In doing so, mobile phone's multimedia information service is increased and improved, allow users to gather the desired information instantly and receive better service.

Figure 2:
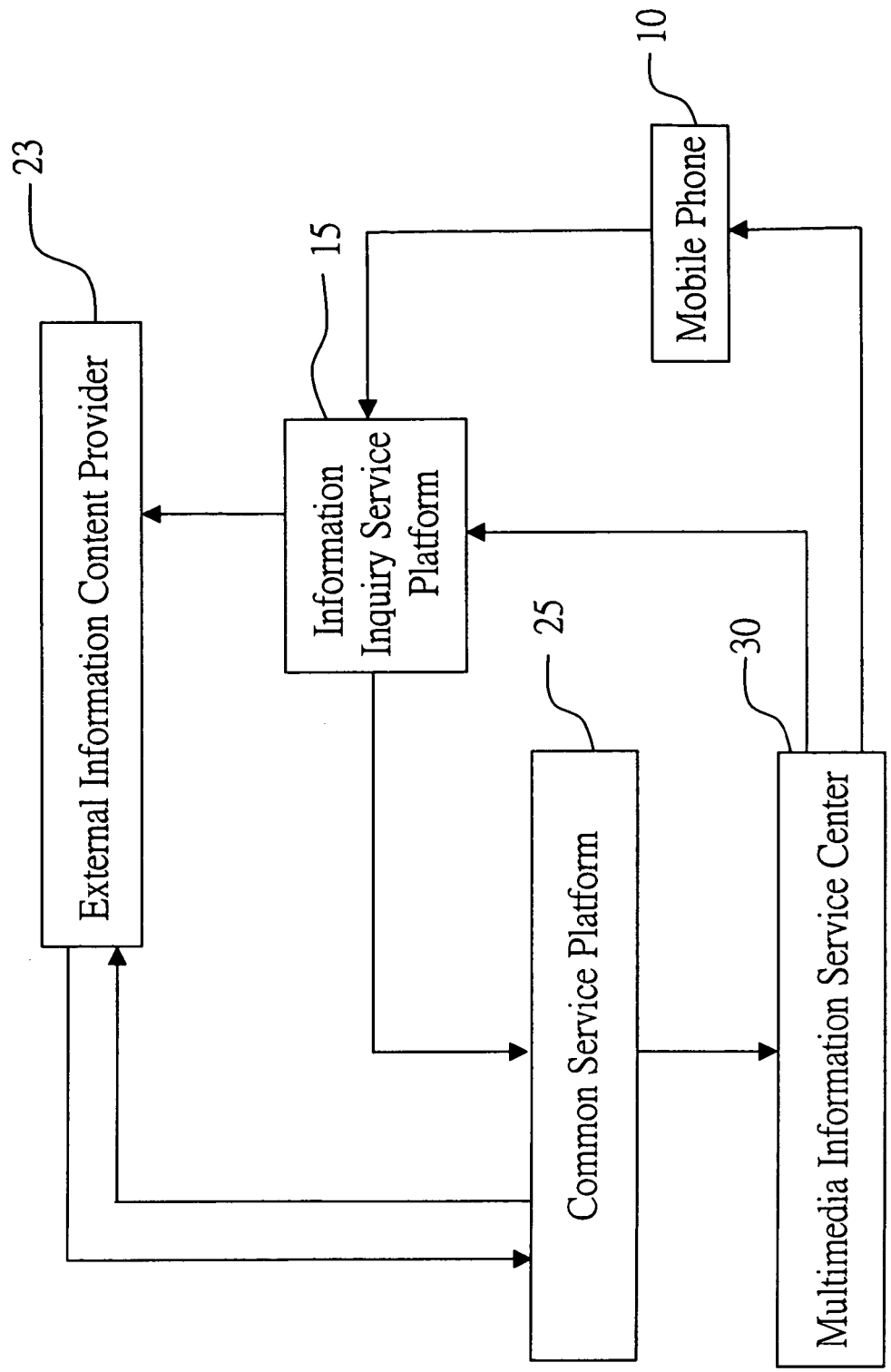
FIG. 2 is a block diagram illustrating a multimedia information and information inquiry download service according to an embodiment of the present invention.

Refer to FIG. 2, which is a block diagram illustrating a multimedia information and information inquiry download service according to an embodiment of the present invention.

As shown in FIG. 2, a user enters the information inquiry service platform 10 via a mobile phone 10. In this embodiment, since the information provider or content server is an external information provider 23, the information inquiry service platform 15 sends a request for the user's desired information to the external information provider 23. According to the received message, the external information provider 23 obtains the desired information, and replies with the information to the common service platform 25. The common service platform 25 then uses the multimedia messaging information service center 30 to send the information to the user's mobile phone 10. After the information is sent by the multimedia information service center 30, it sends a reply to the information inquiry service platform 15. The information inquiry service platform 15 then sends a completion message to the common service platform 15. The completion message contains information regarding the service, service provider, user, etc. to assist in billing or charging for the services rendered.

As illustrated in FIG. 2, when the user's requested or desired information requires the exact location of the user, the external information provider 23 gathers the information regarding the user's location via the common service platform 25. According to the location of the user, the external information provider collects the desired information and sends the desired information to the user's mobile phone 10 through the common service platform 25 and the multimedia information service center 30.

In summary, the structure of the multimedia information and information inquiry download service of the present invention, allows users to use mobile phones 10 through USSD or WAP to enter the information inquiry service platform 15 in order to download desired information. In doing so, people can obtain the desired information using only a mobile phone 10. At the same time, the present invention can also obtain the user's location in order to provide more detailed or accurate information. This location dependent information comprises, for example, maps directions, addresses, business locations, etc. Additionally, the present invention can store the requested information or content in an internal information server 20 or in an external information server 23, in order to increase the flexibility of information storage.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A multimedia information and information inquiry download service comprising:
   a content provider, where information is stored that can be searched and downloaded;
   an information inquiry service platform, that a user using a mobile phone accesses to search and download information, according to the requested information, the information inquiry service platform accesses the content provider to obtain the information;
   a common service platform receives the information from the information inquiry service platform;
   a multimedia information service center receives the information from the common service platform, and then sends the information to the user's mobile phone, responsive to completion of sending the information to the mobile phone the multimedia information service center sends a message to the information inquiry service platform; and the information inquiry service platform transmits data for billing to the common service platform responsive to the message from the multimedia information service center.

2. The multimedia information and information inquiry download service of claim 1, whereby the information inquiry service platform is accessed via unstructured supplementary service data (USSD).

3. The multimedia information and information inquiry download service of claim 1, whereby the information inquiry service platform is accessed via wireless application protocol (WAP).

4. A multimedia information and information inquiry download service comprising:
   a mobile phone;
   a common service platform, where location information is obtained from the mobile phone;
   a content provider, where information is stored that can be searched and downloaded;
   an information inquiry service platform, that a user using the mobile phone accesses to search and download information, according to the requested information, the information inquiry service platform accesses the content provider to obtain the information, where the information to be downloaded is dependent on a location of the mobile phone, the information inquiry service platform obtains location information of the mobile phone via the common service platform and then contacts the content provider to obtain location specific information according to the location information of the user;

the common service platform receives the information from the information inquiry service platform;

a multimedia information service center receives the information from the common service platform, and then sends the information to the user's mobile phone, responsive to completion of sending the information to the mobile phone the multimedia information service center sends a message to the information iniquity service platform; and the information inquiry service platform transmits data for billing to the common service platform responsive to the message from the multimedia information service center.

5. The multimedia information and information inquiry download service of claim 4, whereby the information inquiry service platform is accessed via unstructured supplementary service data (USSD).

6. The multimedia information and information inquiry download service of claim 4, whereby the information inquiry service platform is accessed via wireless application protocol (WAP).

* * * * *